(12) United States Patent
Miyajima et al.

(10) Patent No.: US 6,397,123 B1
(45) Date of Patent: May 28, 2002

(54) NUMERICAL CONTROL APPARATUS

(75) Inventors: Hidehiro Miyajima; Teruo Masuda; Eiji Genma; Kouji Yamamuro, all of Yamanashi (JP)

(73) Assignee: Fanuc Ltd., Yamanashi (JP)

( * ) Notice: Subject to any disclaimer, the term of this patent is extended or adjusted under 35 U.S.C. 154(b) by 0 days.

(21) Appl. No.: 09/320,285

(22) Filed: Jun. 2, 1999

(30) Foreign Application Priority Data

Jun. 2, 1998 (JP) ............................................ 10-167772

(51) Int. Cl.[7] .......................... G06F 19/00; G05B 15/00; G05B 19/42
(52) U.S. Cl. ...................... 700/160; 700/159; 700/180; 700/181; 700/83; 700/89
(58) Field of Search .......................... 700/17, 83, 169, 700/172, 179, 184, 189, 20, 159–160, 180–182

(56) References Cited

U.S. PATENT DOCUMENTS

| | | | | |
|---|---|---|---|---|
| 4,547,854 A | * | 10/1985 | Hashimoto et al. | ......... 364/474 |
| 4,591,968 A | * | 5/1986 | Nozawa et al. | ............. 364/167 |
| 4,607,327 A | * | 8/1986 | Kishi et al. | ................. 364/191 |
| 4,788,481 A | | 11/1988 | Niwa | ......................... 318/600 |
| 5,127,140 A | * | 7/1992 | Oiwa et al. | ................. 29/27 C |
| 5,278,766 A | | 1/1994 | Takahashi | .................. 700/172 |
| 5,315,525 A | * | 5/1994 | Blüthgen et al. | ...... 364/474.26 |
| 5,920,170 A | * | 7/1999 | Seki et al. | ............. 318/568.15 |
| 6,055,461 A | * | 4/2000 | Sumiyama et al. | ......... 700/175 |
| 6,073,058 A | * | 6/2000 | Cossen et al. | ............. 700/184 |
| 6,112,133 A | * | 8/2000 | Fishman | ..................... 700/182 |

FOREIGN PATENT DOCUMENTS

| | | |
|---|---|---|
| DE | 3321072 A1 | 12/1984 |
| JP | 2-76602 | 3/1990 |
| JP | 2-88146 | 3/1990 |
| JP | 5-161290 | 6/1993 |
| JP | 6-159361 | 6/1994 |
| JP | 6-205553 | 7/1994 |
| JP | 10-167772 | 2/1998 |

* cited by examiner

*Primary Examiner*—Paul P. Gordon
*Assistant Examiner*—Crystal J Barnes
(74) *Attorney, Agent, or Firm*—Staas & Halsey, LLP

(57) ABSTRACT

A single machining program including turning and milling program steps together with a turning mode command or a milling mode command is stored in a program memory. When the turning mode command is read out from the program, a numerical control apparatus analyzes the program according to a G code architecture for lathe by numerical controller #1 for turning to control servo motors and a spindle motor. When the milling mode command is read out from the program, the apparatus analyzes the program according to the G code architecture for milling by a numerical controller #2 for milling to control the servo motors and the spindle motor.

8 Claims, 4 Drawing Sheets

NUMERICAL CONTROL APPARATUS

BACKGROUND OF THE INVENTION

1. Field of the Invention

The present invention relates to a numerical control apparatus for a composite working machine which is capable of turning and milling.

2. Description of the Prior Art

When a work is subjected to a series of working processes, a plurality of machine tools corresponding to these working processes are usually required. For example, if a work is to be turned and then milled, it must be first mounted on a lathe for a desired turning process and after the turning process, it must be removed from the lathe and mounted on a milling machine for a desired milling process.

In this way, a work which is subjected to a plurality of different processes requires a corresponding plurality of machine tools and therefore, it takes more man-hours for work mounting, setup, and other steps for these different machine tools, which may significantly degrade the working efficiency. In addition, there were disadvantages that more machine tools required more time and labor to service and maintain them.

To overcome these disadvantages of the prior art, a composite working machine has been developed which is capable of both turning and milling by itself.

A conventional numerical control apparatus used to control such a composite working machine which performs both turning and milling, has been originally designed to control only a lathe system. FIG. 4 is a functional block diagram of such a conventional numerical control apparatus for a composite working machine.

A machining program entered by a manual input or from a external device 72 through a reader/puncher interface 15 is stored in a program memory 100b. Based on the stored machining program, a numerical controller for turning 100a performs interpolation and axis control and drivingly controls a spindle motor 125 through a spindle amplifier 115 as well as X-axis and Z-axis servo motors 121 and 122 through X-axis and Z-axis servo amplifiers 111 and 112, respectively, to perform turning.

When milling is performed, the numerical controller also drivingly controls through a servo amplifier 113 a C-axis servo motor 123 which controls the spindle rotational position, as well as X-axis, Y-axis, and Z-axis servo motors 121, 124, and 122 through servo amplifiers 111, 114, and 112, respectively, to perform milling.

In general, preparatory functions used with the machining program (hereinafter referred to as G code) for a lathe system (turning system) are different from those for a milling system in architecture. A turning program can be created by using G code commands for turning, while a milling program must be created by using only G code commands for turning because G code commands for milling are unavailable. Accordingly, there existed the following disadvantages:

(a) Since only G code commands for turning are available, a milling program is more difficult to create than a numerical control apparatus for a milling-only machine.

(b) A conventional milling program which has been used heretofore cannot be used for such a composite machine without modifications. Another program must be created by using turning commands only.

(c) A G code command for turning may be different from that for milling in meaning (operation), even if those have the same G code number. For example, G code commands "G90" and "G92" for milling are an absolute command and a command for coordinate system setting, respectively, but those commands for turning mean a single outline cutting cycle and a single thread cutting cycle, respectively. Moreover, some G codes are used only for milling but not used for turning and vice versa. This may create confusion for programmers in creating machining programs.

OBJECTS AND SUMMARY OF THE INVENTION

It is an object of the present invention to provide a numerical control apparatus for a composite working machine, which can handle not only G code commands for turning but also those for milling to facilitate the creation of machining programs.

A numerical control apparatus according to the present invention comprises numerical control function for turning and that for milling and also mode switching means for switching between the turning mode and the milling mode depending on a mode switching command contained in a machining program so that the numerical control function for turning or milling can be performed for the selected mode. The numerical control apparatus further comprises means for automatically switching display data on a display screen when the mode is selectively switched.

The present invention allows a single numerical control apparatus to control both turning and milling. In particular, a single machining program according to the present invention can include turning-related commands and milling-related commands, thereby facilitating the creation of machining programs.

In addition, a conventional machining program which has been used heretofore for either turning or milling can be used with the present numerical control apparatus without modifications. G code commands for turning and those for milling can have apparently discriminable formats, which can avoid undesirable confusion about the G code formats.

A single machining program can cause the working machine to perform both turning and milling without the need for creating two programs for respective processes. Therefore, machining programs can be easily maintained because the manager has to manage only a single system of programs.

BRIEF DESCRIPTION OF THE DRAWINGS

The foregoing and other objects and features of the invention will become apparent from the following description of preferred embodiments of the invention with reference to the accompanying drawings, in which.

DETAILED DESCRIPTION OF THE PREFERRED EMBODIMENT

Figure 1:
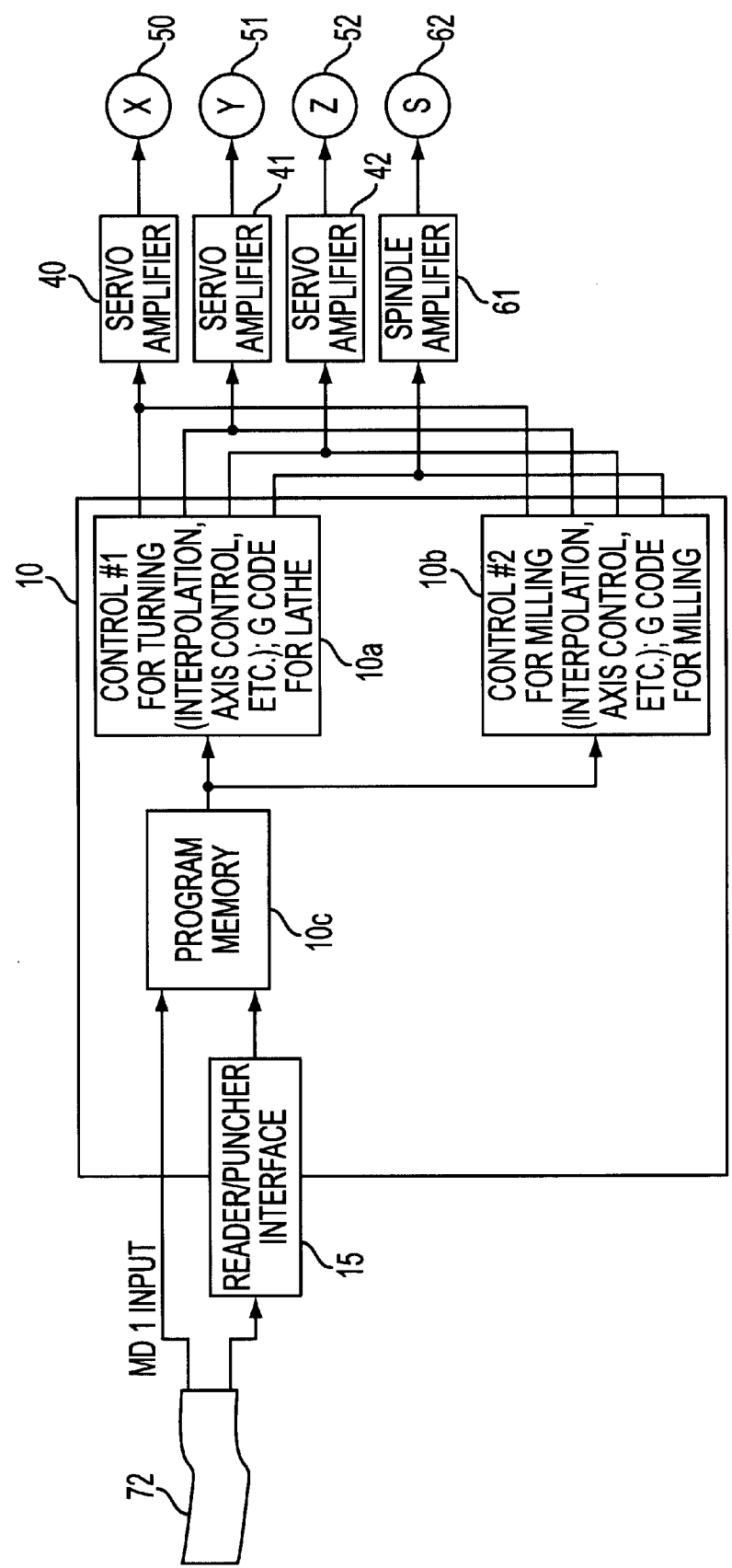
FIG. 1 is a functional block diagram of a numerical control apparatus for a composite working machine according to the present invention.
Figure 4:
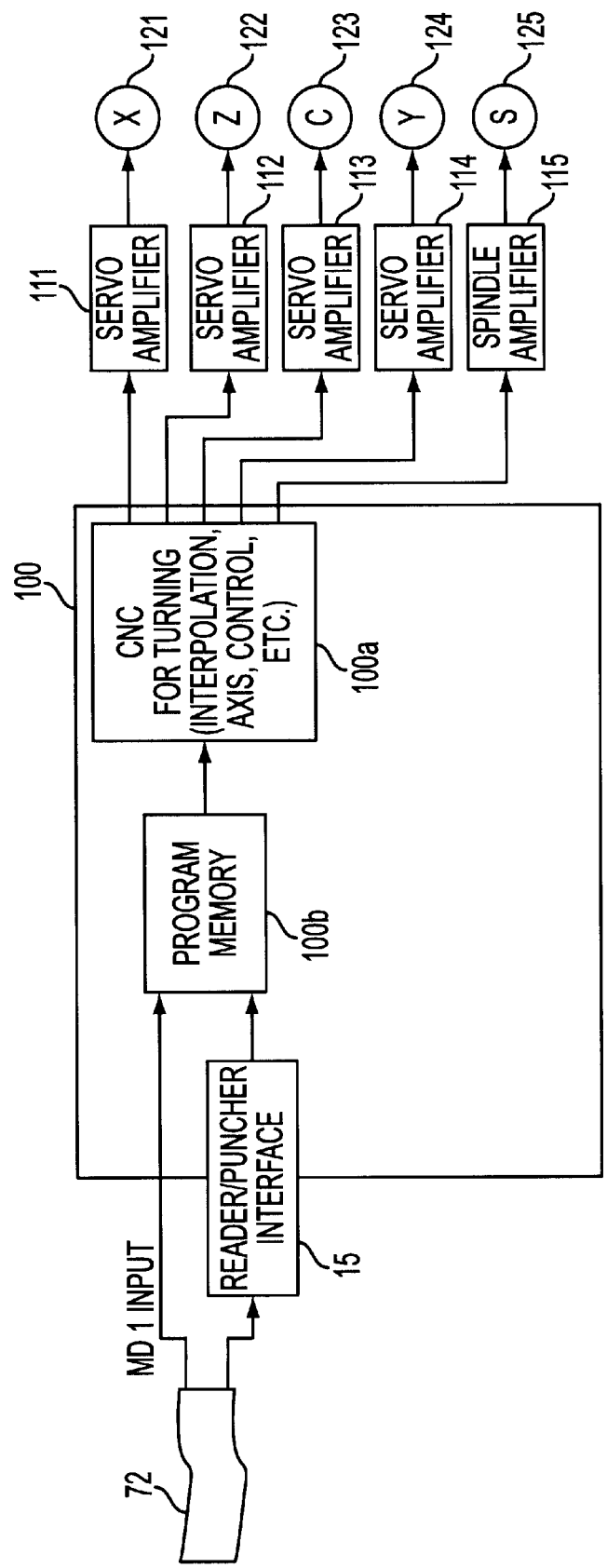
FIG. 4 is a functional block diagram of a conventional numerical control apparatus for a composite working machine.

FIG. 1 is a functional block diagram of a numerical control apparatus for a composite working machine according to the present invention. The present apparatus differs from the conventional apparatus shown in FIG. 4 in that it comprises two numerical controllers.

That is, the numerical control apparatus 10 according to the present invention comprises a numerical controller for turning 10a and another numerical controller for milling 10b and also comprises a program memory 10c for storing a machining program entered by a manual input or from a tape 72 through a reader/puncher interface 15.

Servo amplifiers 40, 41, and 42 which drive X-axis, Y-axis, and Z-axis servo motors 50, 51, and 52, respectively, as well as a spindle amplifier 61 which drives a spindle motor 62 are connected to both the numerical controller for turning 10a and the numerical controller for milling 10b.

Switching between the numerical controllers 10a and 10b is accomplished by including in a machining program a switching command (M code) which switches between turning and milling. This switching command enables a single machining program to include program steps for turning and milling processes, respectively.

For example, assuming that a command for switching to turning is Mxx and a command for switching to milling is Myy, a machining program applicable to the present numerical control apparatus will be as follows:

Mxx
G X Z
G X Z
program step for turning)
. . .
. . .
Myy
G X Y
G X Y
(program step for milling)
. . .
. . .
. . .
Mxx
. . .
. . .

Figure 2:
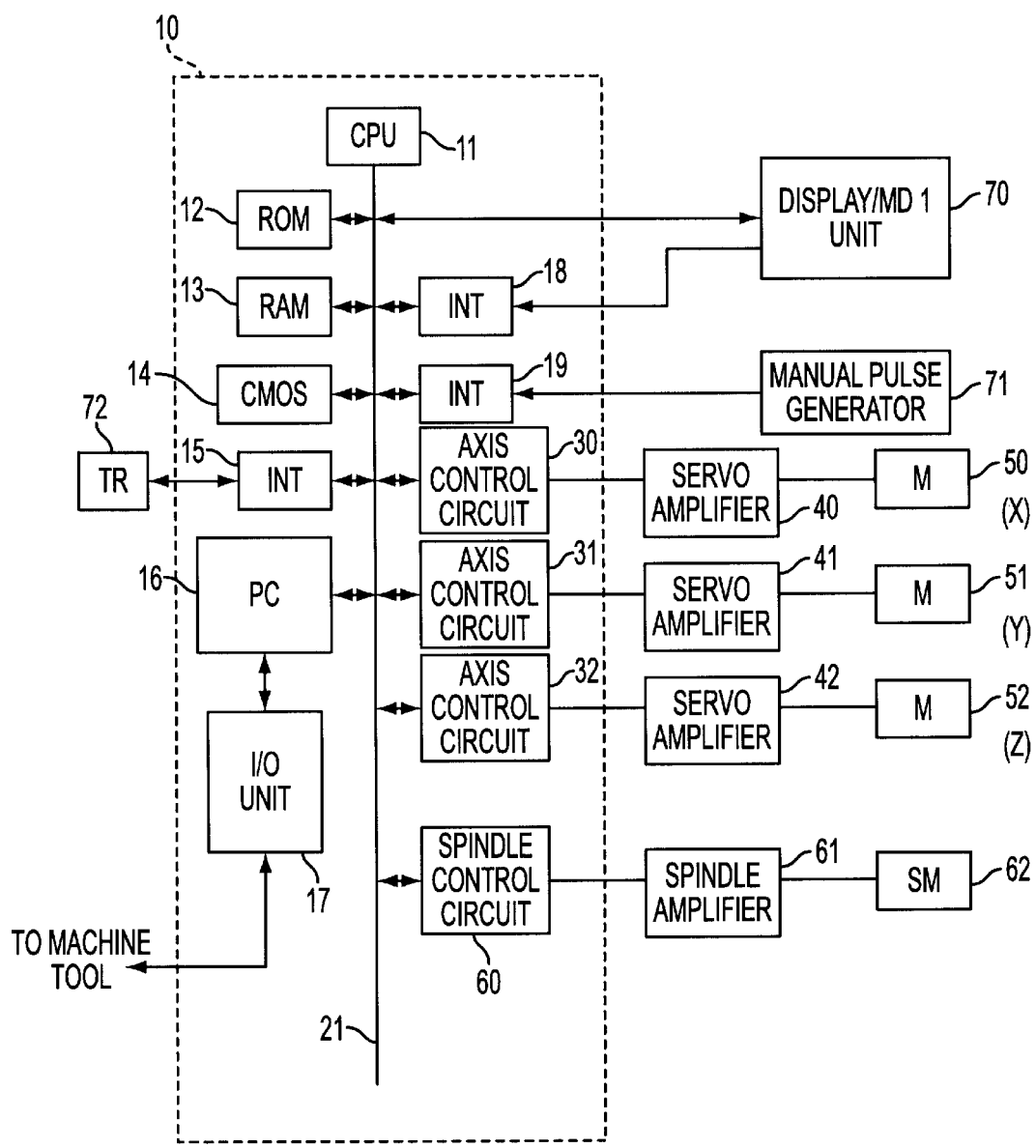
FIG. 2 is a block diagram for showing the essential portion of an embodiment according to the present invention.

FIG. 2 is a block diagram for showing an embodiment of the numerical control apparatus 10 according to the present invention.

A processor 11, which is a processor for controlling the numerical control apparatus 10 totally, reads out a system program stored in a ROM 12 through a bus 21 and controls the numerical control apparatus 10 totally according to the system program. This system program includes a system program step for reading out a machining program and executing a program step for turning or milling depending on a switching command for switching between turning and milling.

A RAM 13 stores temporary computation data and display data. A CMOS memory 14 is a nonvolatile memory (equivalent to the program memory shown in FIG. 1) supported with a backup battery (not shown) to hold its content even when the numerical control apparatus 10 is powered off and stores machining programs and various setting data.

For the purpose of the present invention, the CMOS memory 14 has two separate storage areas, turning data storage area and milling data storage area, each storing data such as offset quantities and, parameters and display data such as current location data.

The reader/puncher interface 15, which is an interface for external devices, is connected to an external device 72 such as a paper tape reader, a paper tape puncher, and a personal computer. For example, a machining program is read out by such a paper tape reader and then stored in the CMOS memory 14. Alternatively, a machining program edited within the numerical control apparatus 10 and stored in the CMOS memory 14 may be provided to such a paper tape puncher for output.

A programmable controller (PC) 16 controls machine tools according to a sequence program stored within the numerical control apparatus 10. That is, depending on the function specified by a command within a machining program, the sequence program converts the command to signals necessary for an appropriate machine tool and supplies them to the machine tool through an I/O unit 17. The output signals cause various actuators in the machine tool to operate. In addition, signals received from a limit switch of the machine tool and various switches in the control panel are processed and passed to the processor 11.

Image signals indicating current locations with respect to each axis, alarms, parameters, and image data are supplied to a display device within a display/MDI unit 70 and displayed on the display device. An interface 18 receives data from a keyboard within the display/MDI unit 70 and passes it to the processor 11. An interface 19 is connected to a manual pulse generator 71 to receive pulses from the manual pulse generator 71. The manual pulse generator 71 is incorporated in the control panel for the machine tool to precisely position any movable member of the machine tool through manual operations.

Axis control circuits 30 through 32 receive axis movement commands from the processor 11 and provide them to the corresponding servo amplifiers 40 through 42. In response to such commands, the servo amplifiers 40 through 42 drive the corresponding servo motors 50 through 52, respectively. The X-axis, Y-axis, and Z-axis servo motors 50, 51, and 52 include a pulse coder for location/speed detection and feedback signals from the pulse coders are fed back to the axis control circuits 30 through 32. Each of the servo control CPUs included in the axis control circuits 30 through 32 processes the position loop, the speed loop, and the current loop based on the feedback signals and the axis movement commands described above and determines a torque command for final control for each axis to control the position and speed of the axis through the servo motor 50, 51 or 52.

A spindle control circuit 60 receives spindle rotation commands and spindle orientation commands and provides spindle speed signals to the spindle amplifier 61. In response to the spindle speed signals, the spindle amplifier 61 rotates the spindle motor 62 at a specified rotational speed. The rotational position of the spindle motor 62 is positioned according to the orientation commands.

Figure 3:
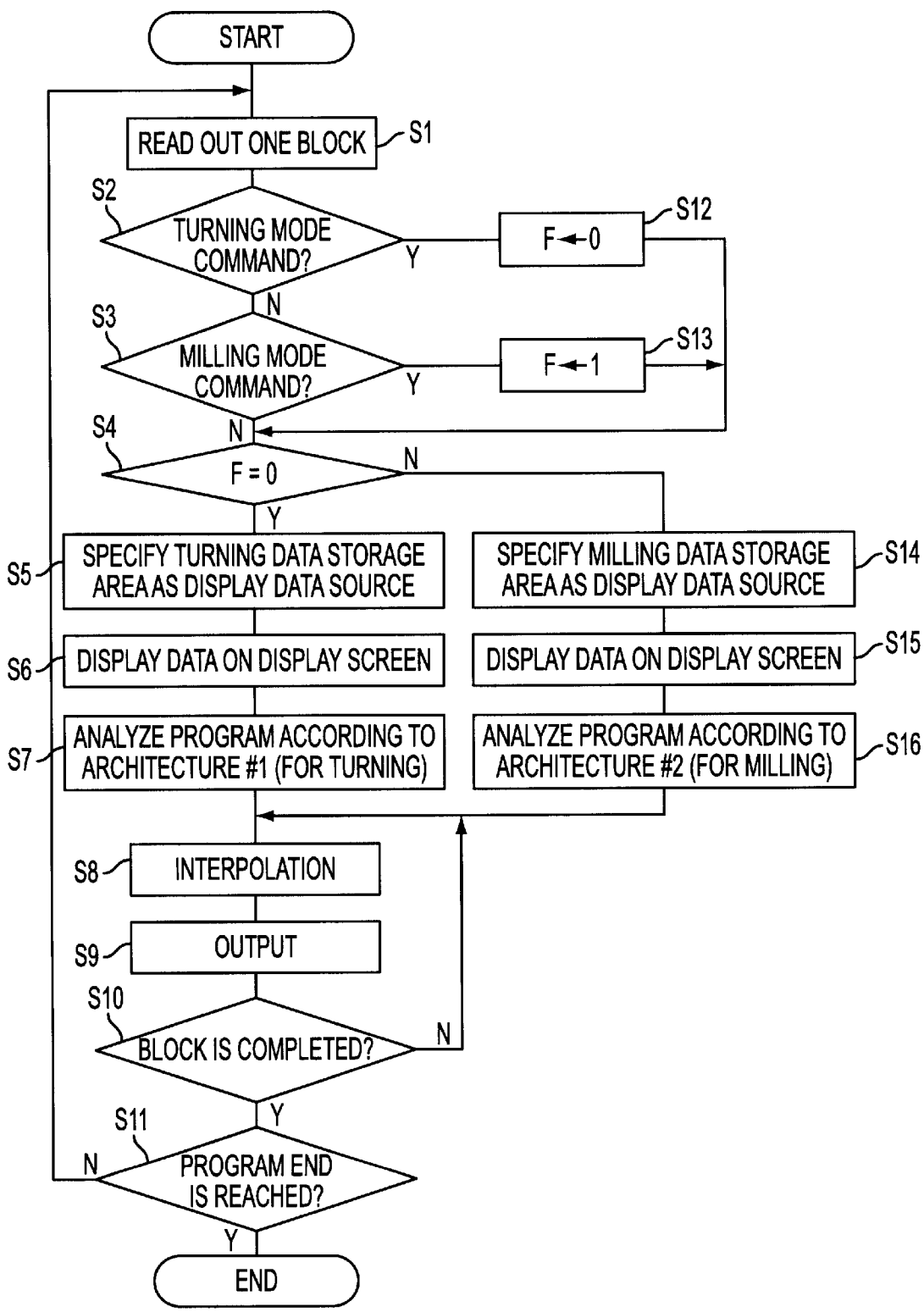
FIG. 3 is a flow chart showing a process for decoding a machining program according to the embodiment of the present invention.

The configuration of an embodiment of the numerical control apparatus according to the present invention has been described above and the processor 11 performs a process for decoding a machining program as shown in FIG. 3 to drivingly control the servo motors 50 through 52 and the spindle motor 62.

As shown in the figure, the processor 11 first reads out a first one block from the machining program stored in the CMOS memory 14 (step S1) and then determines whether the first block I * contains a turning mode command (Mxx) or a milling mode command (Myy) (steps S2 and S3). The flag F is set to "0" if a turning mode command (Mxx) is contained, or the flag F is set to "1" if a milling mode command (Myy) (steps S12 and S13) and the process proceeds with the step S4. If no mode switching command is contained, the flag F remains unchanged and the process proceeds with the step S4. It should be noted that the above decoding process starts with the flag F set to "0".

In the step S4, it is determined whether the flag F is "0" or not, that is, whether the turning mode or the milling mode is specified. If the flag F is "0" and the turning mode is specified, the turning data storage area is specified as the display data source from which necessary display data can be obtained and then offset amounts, various parameters, and current locations are read out from that storage area and displayed on the display within the display/MDI unit 70 (steps S5 and S6). Commands contained in the first block are analyzed according to the architecture #1 for turning, that is, the G code architecture for lathe (step S7).

Based on the result of this analysis, an interpolation process is performed (step S8) and the result is provided to the servo amplifiers 40 through 42 as an output (step S9). Then it is determined whether or not the movement commands have been distributed to the location specified in the block (step S10) and the steps S8 through S10 are repeated until the movement commands are completed.

The interpolation process has been described in FIG. 3 by way of example, however, it should be noted that any command other than such movement commands can be analyzed in the step S7 (and step S16 as described below) in a conventional manner to provide an output. This operation is similar to that for the conventional apparatus and thus omitted from FIG. 3.

It is determined in the step 10 as to whether or not the location specified in the block has been reached and the distribution of the movement commands has been completed, and if the distribution has been completed, then the process proceeds with the step S11. Otherwise, the process returns to the step S8 to continue the interpolation process. In the step S11, it is determined whether or not the program end is reached. If the program end has not been reached, the process returns to the step S1 to repeat the process described above.

On the other hand, if it is determined in the step S4 that the flag F is set to "1" and the milling mode is specified, the milling data storage area is specified as the display data source from which necessary display data can be obtained and then offset amounts, various parameters, and current locations are read out from that storage area and displayed on the display within the display/MDI unit 70 (steps S14 and S15). Commands contained in the block are analyzed according to the architecture #2 for milling, that is, the G code architecture for milling (step S16).

Based on the result of this analysis, the process proceeds with the step S8 to perform the interpolation process (step S8) and the result is provided to the servo amplifiers 40 through 42 as an output (step S9). Then, the interpolation process and the output process are repeated until the distribution of the movement commands to the location specified in the block is completed.

In the embodiment described above, the machining program includes a turning mode command (Mxx) or milling mode command (Myy) to switch between these modes. This may allow the turning and milling processes to be sequentially performed (without removing and mounting workpieces) according to a single machining program including program steps for turning and milling.

What is claimed is:

1. A numerical control apparatus comprising:
   a numerical control unit controlling both a turning operation of a machine using a G code turning system and controlling a milling operation of the machine using a G code milling system; and
   a switching unit switching implementation between the G code turning system and the G code milling system depending on a switching command comprised in a machining program, so that either said numerical control turning operation or said numerical control milling operation is selected by said switching unit.

2. The numerical control apparatus according to claim 1, further comprising a display unit automatically switching between a display screen for turning and a display screen for milling depending on the switching by said switching unit.

3. An apparatus comprising:
   a numerical control unit implementing both a turning operation controlling turning of a machine using a turning code protocol and a milling operation controlling milling of the machine using a milling code protocol; and
   a switching unit switching control of the machine to a selected operation comprising the turning operation or the milling operation, the selected operation based on a switching command comprised in a machining program, wherein if the selected operation is the turning operation the machine is controlled using turning code protocol comprised in the machining program, and if the selected operation is the milling operation the machine is controlled using milling code protocol comprised in the machining program.

4. An apparatus as recited in claim 3, further comprising:
   a display unit automatically switching between a turning display screen and a milling display screen based on the selected operation.

5. An apparatus as recited in claim 3, wherein the turning code protocol is G-code, and the milling code protocol is G-code.

6. A method comprising:
   controlling turning of a machine by a turning operation using a turning code protocol;
   controlling milling of the machine by a milling operation using a milling code protocol; and
   switching control of the machine to a selected unit comprising the turning operation or the milling operation, the selected operation based on a switching command comprised in a machining program, wherein if the selected operation is the turning operation the machine is controlled using turning code protocol comprised in the machining program, and if the selected operation is the milling operation the machine is controlled using milling code protocol comprised in the machining program.

7. A method as recited in claim 6, further comprising:
   switching between a turning display screen and a milling display screen based on the selected operation.

8. A method as recited in claim 6, wherein the turning code protocol is G-code, and the milling code protocol is G-code.

* * * * *

UNITED STATES PATENT AND TRADEMARK OFFICE
CERTIFICATE OF CORRECTION

PATENT NO.    : 6,397,123 B1
DATED         : May 28, 2002
INVENTOR(S)   : Hidehiro Miyajima et al.

It is certified that error appears in the above-identified patent and that said Letters Patent is hereby corrected as shown below:

<u>Column 4,</u>
Line 62, delete "I *".

Signed and Sealed this

Thirtieth Day of July, 2002

*Attest:*

*Attesting Officer*

JAMES E. ROGAN
*Director of the United States Patent and Trademark Office*